(No Model.)

J. L. BONHAM.
NUT LOCK.

No. 547,573. Patented Oct. 8, 1895.

Witnesses:
Albert B. Blackwood.
Jas. H. Blackwood

Inventor.
John L. Bonham
By W. H. Ruff
Attorney.

United States Patent Office.

JOHN L. BONHAM, OF BROCKPORT, ASSIGNOR TO THE PYLE MANUFACTURING COMPANY, OF PHILADELPHIA, PENNSYLVANIA.

NUT-LOCK.

SPECIFICATION forming part of Letters Patent No. 547,573, dated October 8, 1895.

Application filed July 20, 1895. Serial No. 556,611. (No model.)

*To all whom it may concern:*

Be it known that I, JOHN L. BONHAM, of Brockport, in the county of Elk and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks; and its object is to provide a device of such character that a nut may be securely locked or held on a bolt without any liability of its unscrewing or working loose.

The invention consists, essentially, in a washer formed with a central aperture for the passage of a bolt and with a series of holes between said aperture and the circumference of the washer, and the washer formed on opposite sides with a series of tapering projections or ribs which will engage with the nut and with the object to which it is applied and prevent the nut from working loose, as will be hereinafter fully described and claimed.

Figure 1:
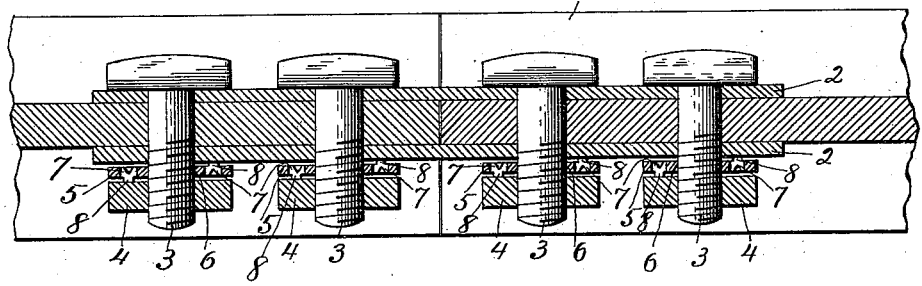
Figure 2:
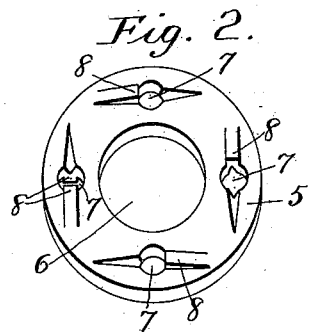
Figure 3:
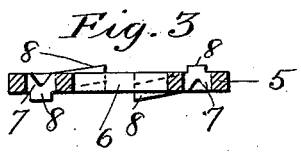

In the accompanying drawings, Figure 1 is a transverse sectional view showing two railroad-rails connected together and provided with my improved nut-lock. Fig. 2 is a perspective view of the nut-lock or washer detached. Fig. 3 is a transverse section of the same.

In the drawings the reference-numeral 1 designates the railroad-rails, 2 the fish-plate, 3 the bolt, and 4 the nut, which may be of any ordinary or suitable construction.

The numeral 5 designates the nut-lock or washer, made of steel and formed with a central aperture 6 for the passage of the bolt. Between the said aperture and the circumference are formed a number of holes 7, and on both faces of the washer are formed a number of tapering projecting ribs 8. The large ends of the ribs intersect with the holes 7 and they are arranged in planes parallel with the circumference of the bolt. It will be seen that there are two of these ribs for each hole on opposite sides of the washer and extending in opposite directions—that is to say, the rib of one hole on one side of the washer has its outer end pointing in the opposite direction from the corresponding rib on the other side.

In using the device the bolt is passed through the object to be connected together and the washer and nut applied. The nut is then screwed home and the said ribs on the washer will bite into the nut and the object they come into contact with, and thus prevent the nut from coming unscrewed. The ribs are preferably formed by stamping with suitable dies either at the time of making the washer or subsequently, as found most convenient and desirable.

While I have shown the washer in connection with a railroad-rail and fish-plate, it is obvious that it can be employed with equal advantage for any other purposes where it is desired to lock the nut upon a bolt.

Having thus described my invention, what I claim is—

As an improved article a washer consisting of a metal disk having a central aperture, a series of holes between the aperture and the circumference, a series of tapering ribs on each face intersecting said holes and pointing in opposite directions, substantially as described.

In testimony whereof I have signed this specification in the presence of two subscribing witnesses.

JOHN L. BONHAM.

Witnesses:
W. C. SCHWEM,
W. D. LUKEHART.